(12) United States Patent
Toyoshima et al.

(10) Patent No.: US 10,501,030 B2
(45) Date of Patent: Dec. 10, 2019

(54) WIRE HARNESS AND METHOD FOR MANUFACTURING THE SAME

(71) Applicant: Hitachi Metals, Ltd., Tokyo (JP)

(72) Inventors: Naoya Toyoshima, Tokyo (JP); Hajime Maejo, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/392,308

(22) Filed: Apr. 23, 2019

(65) Prior Publication Data
US 2019/0344733 A1    Nov. 14, 2019

(30) Foreign Application Priority Data
May 11, 2018    (JP) ................................. 2018-091897

(51) Int. Cl.
| | |
|---|---|
| *B60R 16/02* | (2006.01) |
| *H01R 13/52* | (2006.01) |
| *H02G 3/04* | (2006.01) |
| *H01B 7/00* | (2006.01) |
| *H02G 3/22* | (2006.01) |
| *H02G 3/32* | (2006.01) |
| *H01B 7/282* | (2006.01) |

(52) U.S. Cl.
CPC ....... *B60R 16/0215* (2013.01); *H01B 7/0045* (2013.01); *H01B 7/2825* (2013.01); *H01R 13/5213* (2013.01); *H01R 13/5216* (2013.01); *H02G 3/0406* (2013.01); *H02G 3/22* (2013.01); *H02G 3/32* (2013.01)

(58) Field of Classification Search
CPC .............. B60R 16/0215; H01B 7/2825; H01B 7/0045; H02G 3/32; H02G 3/22; H02G 3/0406; H01R 13/5216; H01R 13/5213

USPC ...................................................... 174/72 A
See application file for complete search history.

(56) References Cited

U.S. PATENT DOCUMENTS

| | | |
|---|---|---|
| 3,617,614 A | 11/1971 | Henry |
| 6,494,731 B1 | 12/2002 | Suzuki |
| | (Continued) | |

FOREIGN PATENT DOCUMENTS

JP    6213447 B2    10/2017

OTHER PUBLICATIONS

United States Office Action dated Aug. 30, 2019 in U.S. Appl. No. 16/391,442.

*Primary Examiner* — Sherman Ng
(74) *Attorney, Agent, or Firm* — McGinn IP Law Group, PLLC (57) ABSTRACT

A wire harness includes a cable that includes a plurality of electric wires and a sheath covering the electric wires, a wire fixing portion that is formed to cover an end portion of the sheath and the electric wires extending out of the end portion of the sheath and fixes the extending directions of the electric wires, and a fixing member attaching portion to which a fixing member used for fixing the cable to a fixing target is attached. The wire fixing portion and the fixing member attaching portion are formed by resin-molding. The wire fixing portion and the fixing member attaching portion are spaced apart from each other in a cable longitudinal direction. The wire fixing portion is relatively movable with respect to the fixing member attaching portion due to flexibility of the cable between the wire fixing portion and the fixing member attaching portion.

6 Claims, 4 Drawing Sheets

(56) References Cited

U.S. PATENT DOCUMENTS

| | | | |
|---|---|---|---|
| 2007/0187144 A1* | 8/2007 | Kato | B60R 16/0215 |
| | | | 174/72 A |
| 2012/0298417 A1 | 11/2012 | Kempeneers et al. | |
| 2015/0270628 A1 | 9/2015 | Kalass | |
| 2015/0355213 A1* | 12/2015 | Kobayashi | G01P 1/026 |
| | | | 324/207.25 |
| 2017/0313265 A1* | 11/2017 | Shimizu | H01B 7/282 |
| 2018/0048081 A1 | 2/2018 | Komori et al. | |

* cited by examiner

WIRE HARNESS AND METHOD FOR MANUFACTURING THE SAME

CROSS-REFERENCE TO RELATED APPLICATIONS

The present application is based on Japanese patent application No. 2018-091897 filed on May 11, 2018, the entire contents of which are incorporated herein by reference.

BACKGROUND OF THE INVENTION

1. Field of the Invention

The invention relates to a wire harness and a method for manufacturing the wire harness.

2. Description of the Related Art

Some wire harnesses for vehicle are known to use a cable formed by covering plural electric wires with a single sheath and are configured that the electric wires extending out of the sheath are branched and routed to different connection points. In such wire harnesses, a wire fixing portion is provided at the branching point of the plural electric wires to fix the extending direction of each electric wire and also to prevent water from entering the inside of the sheath.

Japanese patent No. 6213447 has proposed a wire harness in which a wire fixing portion is integrally formed with a bracket attachment portion to which a bracket (a fixing member) used for fixing the cable to a vehicle body, etc., is attached.

SUMMARY OF THE INVENTION

The wire harness disclosed in Japanese patent No. 6213447 may cause a difficulty in the wiring work, e.g., when each electric wire is routed after attaching the bracket to the vehicle body since the wire fixing portion and the bracket attachment portion are integrally formed.

It is an object of the invention to provide a wire harness that facilitates the wiring work as well as a method for manufacturing the wire harness.

According to an embodiment of the invention, a wire harness comprises:
  a cable that comprises a plurality of electric wires and a sheath covering the plurality of electric wires;
  a wire fixing portion that is formed to cover an end portion of the sheath and the plurality of electric wires extending out of the end portion of the sheath and fixes the extending directions of the plurality of electric wires; and
  a fixing member attaching portion to which a fixing member used for fixing the cable to a fixing target is attached,
  wherein the wire fixing portion and the fixing member attaching portion are formed by resin-molding,
  wherein the wire fixing portion and the fixing member attaching portion are spaced apart from each other in a cable longitudinal direction, and
  wherein the wire fixing portion is relatively movable with respect to the fixing member attaching portion due to flexibility of the cable between the wire fixing portion and the fixing member attaching portion.

According to another embodiment of the invention, a method for manufacturing a wire harness comprising a cable that comprises a plurality of electric wires and a sheath covering the plurality of electric wires, a wire fixing portion that is formed to cover an end portion of the sheath and the plurality of electric wires extending out of the end portion of the sheath and fixes the extending directions of the plurality of electric wires, and a fixing member attaching portion to which a fixing member used for fixing the cable to a fixing target is attached comprises:
  forming a resin-molded body of the wire fixing portion and the fixing member attaching portion by resin-molding; and
  using a mold in the forming of the resin-molded body, the mold comprising a partition wall for separating the wire fixing portion from the fixing member attaching portion in a cable longitudinal direction,
  wherein the wire fixing portion and the fixing member attaching portion are spaced apart from each other in the cable longitudinal direction so that the wire fixing portion is relatively movable with respect to the fixing member attaching portion due to flexibility of the cable between the wire fixing portion and the fixing member attaching portion.

Effect of the Invention

According to an embodiment of the invention, a wire harness can be provided that facilitates the wiring work as well as a method for manufacturing the wire harness.

BRIEF DESCRIPTION OF THE DRAWINGS

FIGS. 1A and 1B are diagrams illustrating a wire harness in an embodiment of the present invention, wherein

DETAILED DESCRIPTION OF THE EMBODIMENTS

Embodiment

An embodiment of the invention will be described below in conjunction with the appended drawings.

General Configuration of Wire Harness

Figure 1A:
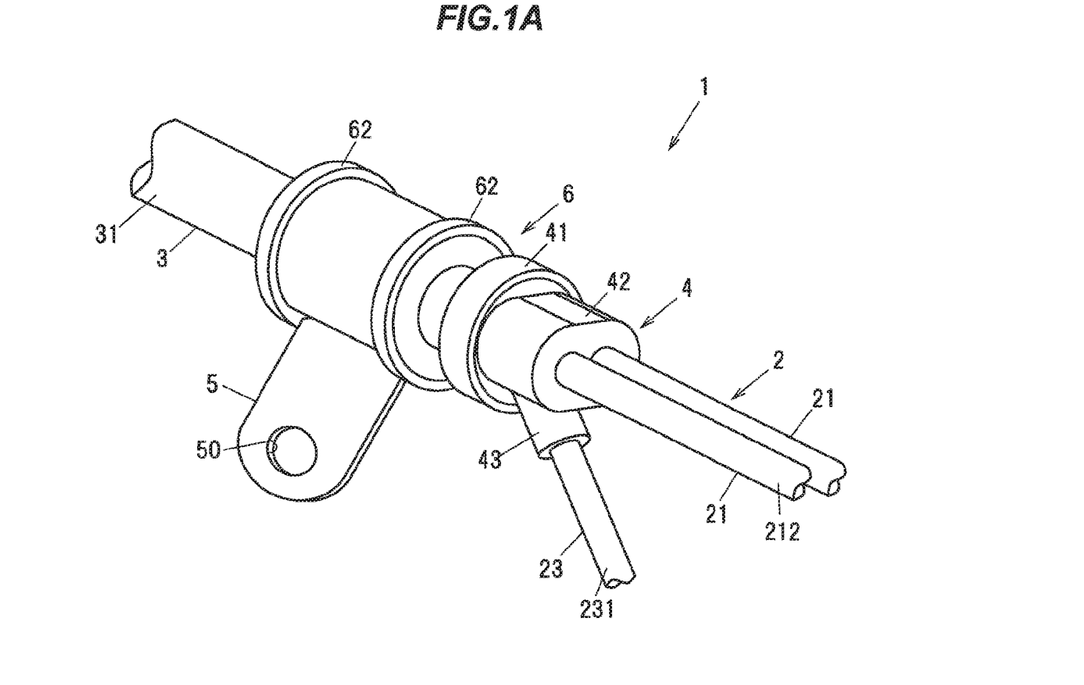
FIG. 1A is a perspective view and FIG. 1B is a side view.
Figure 1B:
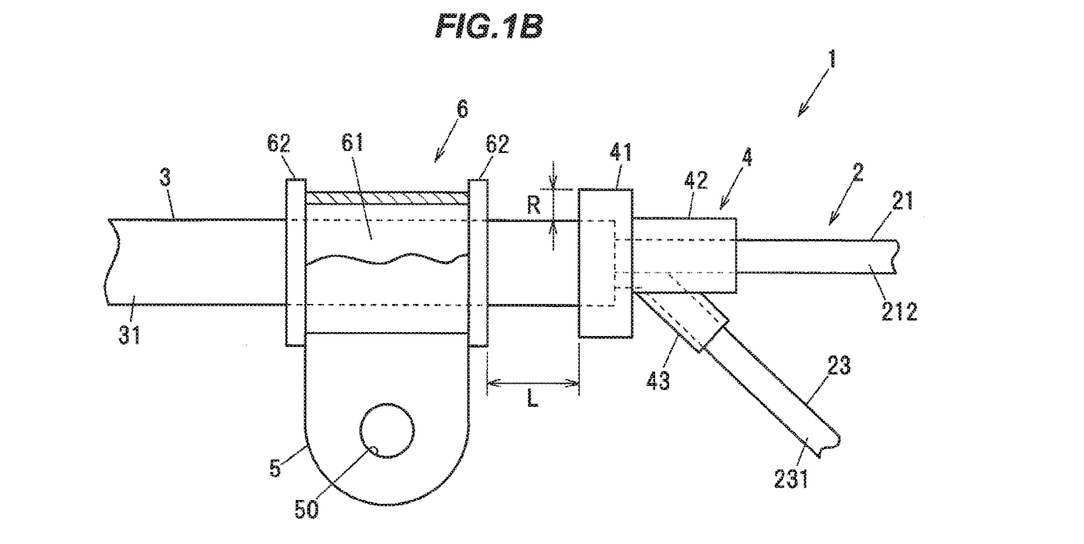

FIGS. 1A and 1B are diagrams illustrating a wire harness in the present embodiment, wherein FIG. 1A is a perspective view and FIG. 1B is a side view. A wire harness 1 in the present embodiment is used in an automobile to supply an operating current to activate an electric parking brake device and to transmit a signal of a rotational speed sensor (anti-lock braking system (ABS) sensor) for measuring the speed of a wheel rotation.

As shown in FIGS. 1A and 1B, the wire harness 1 is provided with a cable 3 which has plural electric wires 2 and a sheath 31 covering the plural electric wires 2, a wire fixing portion 4 which is formed to cover an end portion of the sheath 31 as well as the plural electric wires 2 extending out of the end portion of the sheath 31 and fixes the extending directions of the plural electric wires 2, and a fixing member attaching portion 6 to which a fixing member 5 used for fixing the cable 3 to a fixing target (e.g., an automobile body) is attached.

Configuration of the Cable 3

Figure 2:
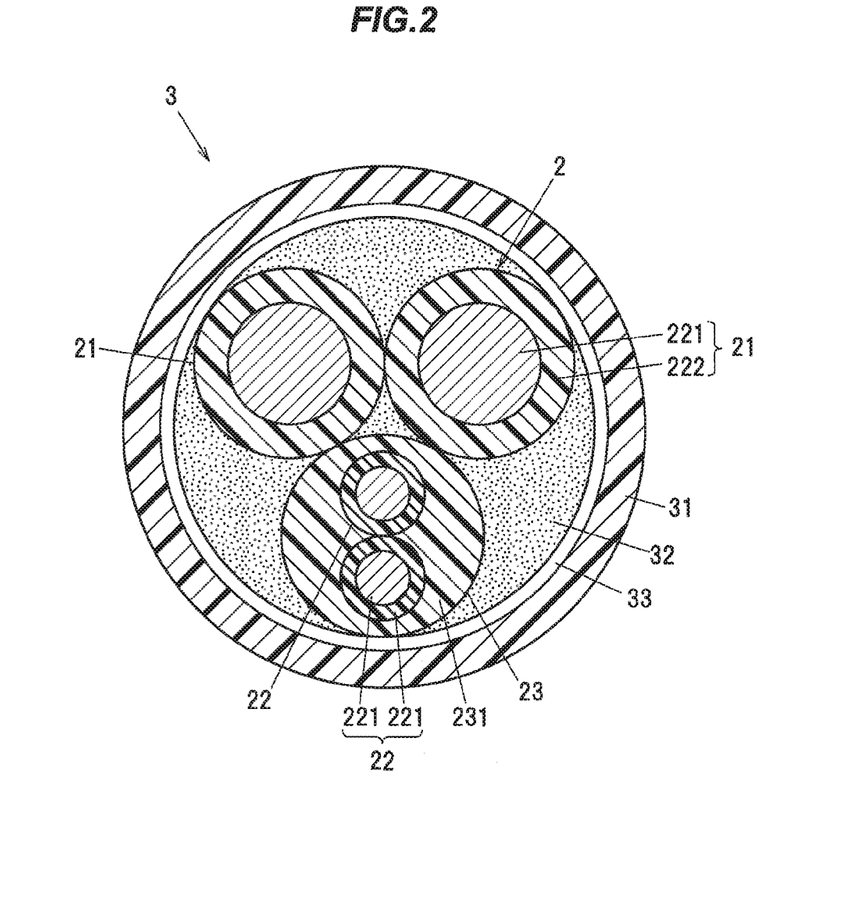
FIG. 2 is a cross sectional view showing a cable taken perpendicular to the longitudinal direction thereof.

FIG. 2 is a cross sectional view showing the cable 3 taken perpendicular to the longitudinal direction thereof. As shown in FIG. 2, the cable 3 has a pair of power lines 21 for supplying an operating current to the electric parking brake device and a pair of signal lines 22 for transmitting a signal from the rotational speed sensor.

Each of the pair of power lines 21 is an insulated wire in which a metal conductor 211 formed by twisting plural metal strands is covered with an insulation 212. An electric current output from a controller (not shown) is supplied to the electric parking brake device through the pair of power lines 21. Meanwhile, each of the pair of signal lines 22 is an insulated wire in which a metal conductor 221 formed by twisting plural metal strands is covered with an insulation 222. A signal output from the rotational speed sensor is transmitted to the controller (not shown) through the pair of signal lines 22. In the present embodiment, an inner sheath 231 formed of a thermoplastic urethane is applied around the twisted pair of signal lines 22, thereby forming a signal cable 23 in which the pair of signal lines 22 are integrated.

The pair of power lines 21, the signal cable 23 and plural fillers 32 are twisted together, and a binding tape 33 such as paper tape is spirally wound therearound. The sheath 31 is provided around the binding tape 33. The sheath 31 is pliable (flexible) enough to flexibly bend when routing the wire harness 1, and the sheath 31 in the present embodiment is formed of a thermoplastic urethane.

Configurations of the Wire Fixing Portion 4 and the Fixing Member Attaching Portion 6

Back to FIGS. 1A and 1B, the wire fixing portion 4 covers the branching point of the plural electric wires 2 and extends across the sheath 31 and each of the electric wires 2. The wire fixing portion 4 serves to fix the extending direction of each electric wire 2 and also serves to prevent water from entering the inside of the sheath 31 through the branching point of the electric wires 2. Hereinafter, a portion of the electric wire 2 in the vicinity of the end portion of the sheath 31 is referred to as an extending portion of the electric wire 2.

The wire fixing portion 4 integrally has a sheath enclosing portion 41 covering the end portion of the sheath 31, a power line enclosing portion 42 covering the extending portions of the power lines 21, and a signal line enclosing portion 43 covering the signal cable 23. In the present embodiment, a direction of the pair of power lines 21 extending from the power line enclosing portion 42 is parallel to the longitudinal direction of the sheath 31 inside the sheath enclosing portion 41. A direction of the signal cable 23 extending from the signal line enclosing portion 43 is inclined (intersects) with respect to the direction of the power lines 21 extending from the power line enclosing portion 42. The signal cable 23 is bent inside the wire fixing portion 4 at an angle corresponding to the inclination. Due to the inclination of the electric wire extending direction, the pair of power lines 21 and the signal cable 23 can be easily routed in a wheel-well of an automobile.

The wire fixing portion 4 is formed by resin-molding. The wire fixing portion 4 used in the present embodiment is formed of a thermoplastic urethane which is the same resin material as for the sheath 31. In the present embodiment, since the sheath 31 and also the inner sheath 231 of the signal cable 23 are formed of a thermoplastic urethane, the wire fixing portion 4, the sheath 31 and the inner sheath 231 are melted and integrated (fused together) during the resin-molding process to form the wire fixing portion 4, resulting in that water is prevented from entering the inside of the sheath 31 and water tightness is improved. In addition, the fusion of the wire fixing portion 4 with the sheath 31 also prevents the wire fixing portion 4 from moving in the longitudinal direction of the cable 3.

The fixing member attaching portion 6 integrally has a cylindrical attachment portion 61 to which the fixing member 5 is attached, and annular flange portions 62 provided respectively at both axial end portions of the attachment portion 61 so as to protrude radially outward. The attachment portion 61 is formed in a cylindrical shape coaxial with the cable 3. The flange portions 62 serve to restrict movement of the fixing member 5 along the cable longitudinal direction (the axial direction of the attachment portion 61).

The fixing member attaching portion 6 is formed by resin-molding in the same manner as the wire fixing portion 4. In the present embodiment, the fixing member attaching portion 6 is formed of the same resin material as for the sheath 31 and the wire fixing portion 4, and is formed of a thermoplastic urethane. Thus, the fixing member attaching portion 6 and the sheath 31 are melted and integrated (fused together) during the resin-molding process to form the fixing member attaching portion 6, and it is thereby possible to prevent the fixing member attaching portion 6 from moving in the longitudinal direction of the cable 3. In addition, use of the same resin material to form the wire fixing portion 4 and the fixing member attaching portion 6 allows a single molding process to simultaneously form the wire fixing portion 4 and the fixing member attaching portion 6, contributing to simplification of the manufacturing process and reduction in manufacturing cost.

The fixing member 5 in the present embodiment is a cable clamp formed of a metal. The fixing member 5 is clamped on the attachment portion 61. The fixing member 5 is formed by bending a rectangular metal sheet, is curved at one end to wrap around the attachment portion 61 and has, at the other end, a bolt insertion hole 50 for inserting a bolt used to fix to a mounting object such as vehicle body. The material of the fixing member 5 is not limited to metal and the fixing member 5 may be formed of, e.g., a resin.

The wire harness 1 in the present embodiment is configured that the wire fixing portion 4 and the fixing member attaching portion 6 are spaced apart from each other in the longitudinal direction of the cable 3. That is, in the present embodiment, the wire fixing portion 4 and the fixing member attaching portion 6 are separate parts and a portion of the cable 3 is located between the wire fixing portion 4 and the fixing member attaching portion 6. In other words, the wire fixing portion 4 and the fixing member attaching portion 6 are coupled via the portion of the cable 3.

In this configuration, the wire fixing portion 4 is relatively movable with respect to the fixing member attaching portion 6 due to flexibility of the cable 3 between the wire fixing portion 4 and the fixing member attaching portion 6. Therefore, even after the fixing member 5 is fixed to a vehicle body, etc., and the position of the fixing member attaching portion 6 is fixed, it is possible to move the position of the wire fixing portion 4 since the cable 3 between the wire fixing portion 4 and the fixing member attaching portion 6 can be bent and this facilitates work to route the power lines 21 and the signal cable 23. In other words, in the present embodiment, the position of a connector or a sensor, etc., provided at an end of each electric wire 2 (the power lines 21 and the signal cable 23) can be aligned in position by using flexibility of each electric wire 2 as well as flexibility of the cable 3 and it is thus possible to arrange the connector or sensor, etc., while preventing damage to each electric wire 2.

When the wire fixing portion 4 is too close to the fixing member attaching portion 6, the wire fixing portion 4 comes into contact with the fixing member attaching portion 6, causing a decrease in the degree of freedom of wiring work. Therefore, a distance L between the wire fixing portion 4 and the fixing member attaching portion 6 along the cable longitudinal direction is desirably not less than a wall thickness R of the wire fixing portion 4 at an end on the fixing member attaching portion 6 side, i.e., of the sheath enclosing portion 41. Since the distance L between the wire fixing portion 4 and the fixing member attaching portion 6 along the cable longitudinal direction is set to not less than the wall thickness R of the sheath enclosing portion 41, the wire fixing portion 4 is less likely to come into contact with (less likely to hit) the fixing member attaching portion 6 even when the cable 3 between the wire fixing portion 4 and the fixing member attaching portion 6 is bent, and it is easy to route the power lines 21 and the signal cable 23.

In addition, since the wire fixing portion 4 and the fixing member attaching portion 6 are formed by resin-molding using a single mold in the present embodiment (the details will be described later), a wall separating the wire fixing portion 4 from the fixing member attaching portion 6 (a partition wall) is very thin and is likely to deform when the wire fixing portion 4 is too close to the fixing member attaching portion 6, and the lifetime of the mold may decrease. Therefore, the distance L between the wire fixing portion 4 and the fixing member attaching portion 6 along the cable longitudinal direction is preferably at least not less than 1 mm, more preferably, not less than 5 mm.

Meanwhile, in the present embodiment, when the wire fixing portion 4 is too far from the fixing member attaching portion 6 in the single mold, the size of the mold is increased meaninglessly, leading to an increase in the manufacturing cost. Therefore, the distance L between the wire fixing portion 4 and the fixing member attaching portion 6 along the cable longitudinal direction is preferably not more than 50 mm Reducing the distance L between the wire fixing portion 4 and the fixing member attaching portion 6 also prevents the wire fixing portion 4 from largely swinging with vibration of the vehicle. In view of further preventing the wire fixing portion 4 from largely swinging with vibration of the vehicle, the distance L is more preferably not more than 20 mm.

Providing the wire fixing portion 4 and the fixing member attaching portion 6 separately may cause an increase in the number of components. In the present embodiment, however, since the wire fixing portion 4 and the fixing member attaching portion 6 are formed by resin-molding, the number of components virtually does not increase, hence, a problem of caused by an increase in the number of components, such as an increase in the maintenance cost, does not occur. In addition, in the present embodiment, the wire fixing portion 4 and the fixing member attaching portion 6 can be formed by resin-molding once (the details will be described later). Therefore, as compared to when the wire fixing portion 4 and the fixing member attaching portion 6 are separately made and attached to the cable 3, it is possible to manufacture the wire harness more easily in a short time and thereby possible to improve mass productivity.

Method for Manufacturing the Wire Harness

Figure 3:
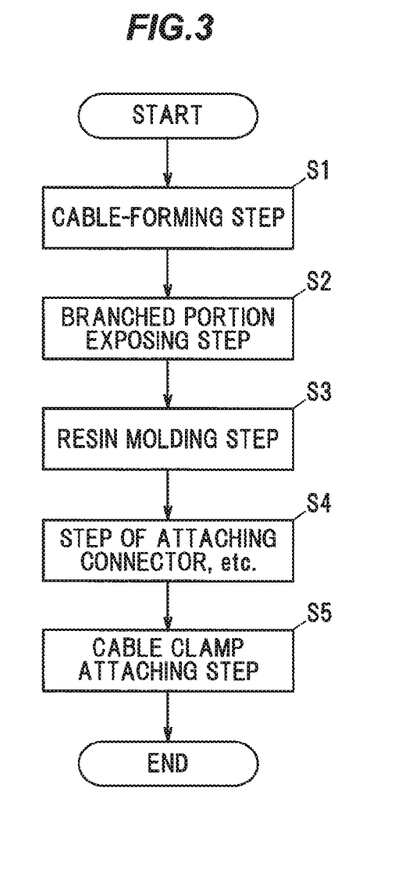
FIG. 3 is a flowchart showing a procedure of a method for manufacturing the wire harness in the embodiment of the invention.

FIG. 3 is a flowchart showing a procedure of a method for manufacturing the wire harness in the present embodiment. To manufacture the wire harness 1, firstly, a cable-forming step is performed in Step S1 in which the cable 3 is formed, as shown in FIG. 3. Then, a branched portion exposing step is performed in Step S2 in which the power lines 21 and the signal cable 23 are exposed by partially removing the sheath 31 and the binding tape 33 of the cable 3 as a preparation for branching the electric wires 2.

Figure 4A:
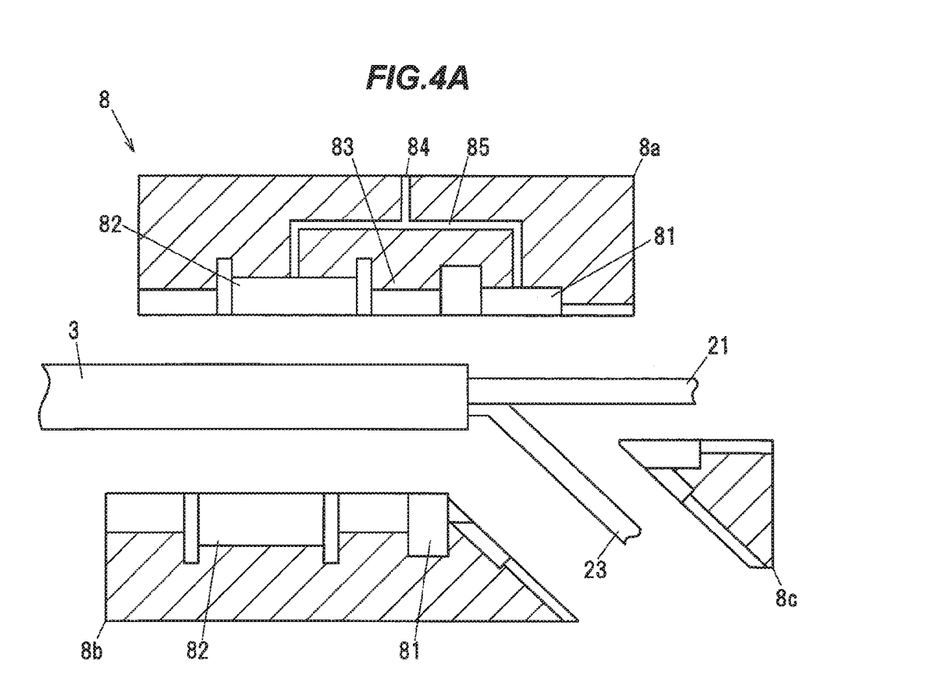
FIGS. 4A and 4B are explanatory diagrams illustrating a resin-molding step.
Figure 4B:
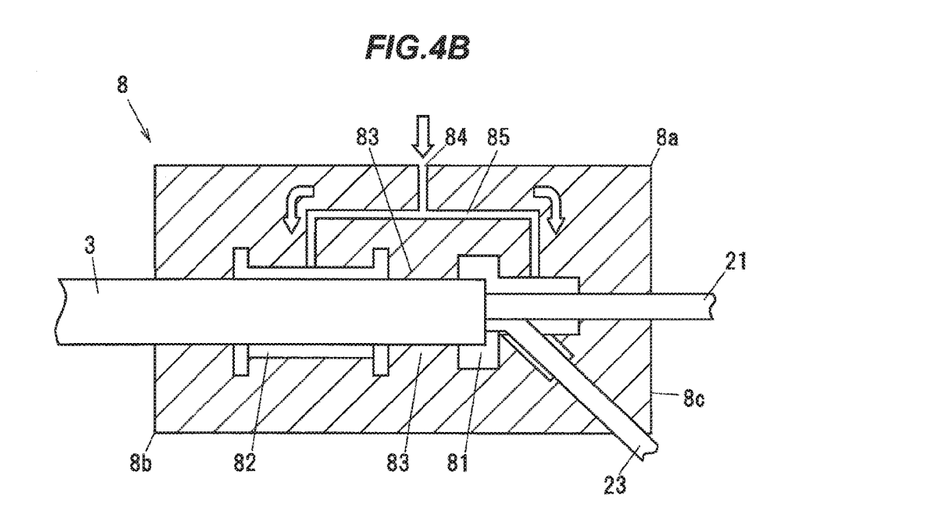

After that, a resin-molding step is performed in Step S3 in which the wire fixing portion 4 and the fixing member attaching portion 6 are formed by resin-molding. As shown in FIGS. 4A and 4B, a mold 8 used in the resin-molding step has a partition wall 83 for separating the wire fixing portion 4 from the fixing member attaching portion 6 in the cable longitudinal direction.

The mold 8 has a wire fixing portion-molding section 81 for receiving a resin poured thereinto and molding the resin into the wire fixing portion 4, and a fixing member attaching portion-molding section 82 for receiving a resin poured thereinto and molding the resin into form the fixing member attaching portion 6. The partition wall 83 is formed between the wire fixing portion-molding section 81 and the fixing member attaching portion-molding section 82. The mold 8 also has one resin inlet 84 and a resin flow path 85 which is branched from the resin inlet 84 and brings the resin into both the wire fixing portion-molding section 81 and the fixing member attaching portion-molding section 82. Although the mold 8 split into three parts, which are an upper mold 8a, a first lower mold 8b and a second lower mold 8c, is shown in FIGS. 4A and 4B, the number of split parts of the mold 8 is not limited thereto, and where to split the mold 8 is also not limited to the example shown in the drawings.

When the resin is poured from the resin inlet 84 in a state in which the cable 3 is placed in the mold 8, the resin is poured into the wire fixing portion-molding section 81 and the fixing member attaching portion-molding section 82 via the resin flow path 85. Once the resin poured into the wire fixing portion-molding section 81 and the fixing member attaching portion-molding section 82 cools and solidifies, the wire fixing portion 4 and the fixing member attaching portion 6 are formed. Since the mold 8 has the partition wall 83, the wire fixing portion 4 and the fixing member attaching portion 6 after being formed are spaced apart from each other in the longitudinal direction of the cable 3. As a result, the wire fixing portion 4 is relatively movable with respect to the fixing member attaching portion 6 due to flexibility of the cable 3 between the wire fixing portion 4 and the fixing member attaching portion 6.

The wire fixing portion 4 and the fixing member attaching portion 6 in the present embodiment are structurally separated, but labor hours to manufacture can be reduced since the wire fixing portion 4 and the fixing member attaching portion 6 can be formed by resin-molding once using the single mold 8.

After performing the resin-molding step in Step S3, a step of attaching connector, etc., is performed in Step S4 in which a connector and a sensor, etc., are attached to the ends of the power lines 21 and the signal cable 23. After that, a fixing member attaching step is performed in Step S5 in which the fixing member 5 is attached to the fixing member attaching portion 6. The wire harness 1 is thereby obtained.

Functions and Effects of the Embodiment

As described above, in the wire harness 1 of the present embodiment, the wire fixing portion 4 and the fixing member attaching portion 6 are formed by resin-molding and are spaced apart from each other in the cable longitudinal direction, and the wire fixing portion 4 is relatively movable with respect to the fixing member attaching portion 6 due to flexibility of the cable 3 between the wire fixing portion 4 and the fixing member attaching portion 6.

Due to this configuration, it is easy to route the power lines 21 and the signal cable 23 even after the cable 3 is fixed to a vehicle body, etc., by the fixing member 5. In addition, even when the power lines 21 or the signal cable 23 swing due to vibration of the vehicle, damage to the extending portions of the power lines 21 and the signal cable 23 extending out of the wire fixing portion 4 can be prevented since swing is reduced at the cable 3 between the wire fixing portion 4 and the fixing member attaching portion 6.

SUMMARY OF THE EMBODIMENT

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A wire harness (1), comprising: a cable (3) that comprises a plurality of electric wires (2) and a sheath (31) covering the plurality of electric wires (2); a wire fixing portion (4) that is formed to cover an end portion of the sheath (31) and the plurality of electric wires (2) extending out of the end portion of the sheath (31) and fixes the extending directions of the plurality of electric wires (2); and a fixing member attaching portion (6) to which a fixing member (5) used for fixing the cable (3) to a fixing target is attached, wherein the wire fixing portion (4) and the fixing member attaching portion (6) are formed by resin-molding, wherein the wire fixing portion (4) and the fixing member attaching portion (6) are spaced apart from each other in a cable longitudinal direction, and wherein the wire fixing portion (4) is relatively movable with respect to the fixing member attaching portion (6) due to flexibility of the cable (3) between the wire fixing portion (4) and the fixing member attaching portion (6).

[2] The wire harness (1) according to [1], wherein a distance between the wire fixing portion (4) and the fixing member attaching portion (6) along the cable longitudinal direction is not less than a wall thickness of the wire fixing portion (4) at an end on the fixing member attaching portion (6) side.

[3] The wire harness (1) according to [1] or [2], wherein the distance between the wire fixing portion (4) and the fixing member attaching portion (6) along the cable longitudinal direction is not less than 1 mm.

[4] The wire harness (1) described in any of [1] to [3], wherein the wire fixing portion (4) and the fixing member attaching portion (6) comprise a same resin material.

[5] A method for manufacturing a wire harness (1) comprising a cable (3) that comprises a plurality of electric wires (2) and a sheath (31) covering the plurality of electric wires (2), a wire fixing portion (4) that is formed to cover an end portion of the sheath (31) and the plurality of electric wires (2) extending out of the end portion of the sheath (31) and fixes the extending directions of the plurality of electric wires (2), and a fixing member attaching portion (6) to which a fixing member (5) used for fixing the cable (3) to a fixing target is attached, the method comprising: forming a resin-molded body of the wire fixing portion (4) and the fixing member attaching portion (6); and using a mold (8) in the forming of the resin-molded body, the mold comprising a partition wall (83) for separating the wire fixing portion (4) from the fixing member attaching portion (6) in a cable longitudinal direction, wherein the wire fixing portion (4) and the fixing member attaching portion (6) are spaced apart from each other in the cable longitudinal direction so that the wire fixing portion (4) is relatively movable with respect to the fixing member attaching portion (6) due to flexibility of the cable (3) between the wire fixing portion (4) and the fixing member attaching portion (6).

[6] The method for manufacturing a wire harness according to [5], wherein the mold (8) comprises: a wire fixing portion-molding section (81) for receiving a resin poured thereinto and molding the resin into the wire fixing portion (4); a fixing member attaching portion-molding section (82) for receiving a resin poured thereinto and molding the resin into the fixing member attaching portion (6); and a resin flow path (85) that is branched from a resin inlet (84) and brings the resin into both the wire fixing portion-molding section (81) and the fixing member attaching portion-molding section (82).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist of the present invention. For example, although the signal cable 23 formed by providing the inner sheath 231 around the pair of signal lines 22 has been described in the embodiment, it is not limited thereto. The configuration may be such that the inner sheath 231 is omitted and the pair of signal lines 22 extend out of an end portion of the sheath 31.

In addition, although the wire harness 1 provided with one fixing member attaching portion 6 has been described in the embodiment, the wire harness 1 may be provided with plural fixing member attaching portions 6. In this case, the wire fixing portion 4 and the fixing member attaching portion 6 closest thereto are spaced apart from each other in the cable longitudinal direction.

The invention claimed is:

1. A wire harness, comprising:
   a cable that comprises a plurality of electric wires and a sheath covering the plurality of electric wires;
   a wire fixing portion that is formed to cover an end portion of the sheath and the plurality of electric wires extending out of the end portion of the sheath and fixes the extending directions of the plurality of electric wires; and
   a fixing member attaching portion to which a fixing member used for fixing the cable to a fixing target is attached,
   wherein the wire fixing portion and the fixing member attaching portion are formed by resin-molding,
   wherein the wire fixing portion and the fixing member attaching portion are spaced apart from each other in a cable longitudinal direction, and
   wherein the wire fixing portion is relatively movable with respect to the fixing member attaching portion due to flexibility of the cable between the wire fixing portion and the fixing member attaching portion.

2. The wire harness according to claim 1, wherein a distance between the wire fixing portion and the fixing member attaching portion along the cable longitudinal direction is not less than a wall thickness of the wire fixing portion at an end on the fixing member attaching portion side.

3. The wire harness according to claim 1, wherein the distance between the wire fixing portion and the fixing member attaching portion along the cable longitudinal direction is not less than 1 mm.

4. The wire harness according to claim 1, wherein the wire fixing portion and the fixing member attaching portion comprise a same resin material.

5. A method for manufacturing a wire harness comprising a cable that comprises a plurality of electric wires and a sheath covering the plurality of electric wires, a wire fixing portion that is formed to cover an end portion of the sheath and the plurality of electric wires extending out of the end portion of the sheath and fixes the extending directions of the plurality of electric wires, and a fixing member attaching portion to which a fixing member used for fixing the cable to a fixing target is attached, the method comprising:

forming a resin-molded body of the wire fixing portion and the fixing member attaching portion by resin-molding; and using a mold in the forming of the resin-molded body, the mold comprising a partition wall for separating the wire fixing portion from the fixing member attaching portion in a cable longitudinal direction, wherein the wire fixing portion and the fixing member attaching portion are spaced apart from each other in the cable longitudinal direction so that the wire fixing portion is relatively movable with respect to the fixing member attaching portion due to flexibility of the cable between the wire fixing portion and the fixing member attaching portion.

6. The method according to claim 5, wherein the mold comprises:

a wire fixing portion-molding section for receiving a resin poured thereinto and molding the resin into the wire fixing portion;

a fixing member attaching portion-molding section for receiving a resin poured thereinto and molding the resin into the fixing member attaching portion; and a resin flow path that is branched from a resin inlet and brings the resin into both the wire fixing portion-molding section and the fixing member attaching portion-molding section.

* * * * *